(12) United States Patent
Cheng et al.

(10) Patent No.: US 6,439,595 B1
(45) Date of Patent: Aug. 27, 2002

(54) FLIP-DOWN BALL MOUNT COVER ASSEMBLY

(76) Inventors: John C. Cheng, 14317 E. Don Julian Rd., Industry, CA (US) 91746; Calvin S. Wang, 14317 E. Don Julian Rd., Industry, CA (US) 91746

( * ) Notice: Subject to any disclaimer, the term of this patent is extended or adjusted under 35 U.S.C. 154(b) by 0 days.

(21) Appl. No.: 09/843,995

(22) Filed: Apr. 30, 2001

(51) Int. Cl.$^7$ ................................................. B60D 1/60
(52) U.S. Cl. ........................................................ 280/507
(58) Field of Search ........................ 280/504, 506, 280/507

(56) References Cited

U.S. PATENT DOCUMENTS

| | | | | |
|---|---|---|---|---|
| 5,593,170 A | * | 1/1997 | Chiu | 280/422 |
| 5,603,178 A | * | 2/1997 | Morrison | 280/507 |
| 6,019,386 A | * | 2/2000 | Morelock | 280/420 |
| 6,164,680 A | * | 12/2000 | Kluhsman | 280/507 |
| 6,199,892 B1 | * | 3/2001 | Dahl | 280/292 |
| 6,260,874 B1 | * | 7/2001 | Smith et al. | 280/507 |

* cited by examiner

Primary Examiner—Kevin Hurley
(74) Attorney, Agent, or Firm—Albert O. Cota

(57) ABSTRACT

A flip-down ball-mount cover assembly (10) which functions in combination with a ball-mount (130) as is typically attached to a trailer and is inserted into a ball-mount receiver (120) that is attached to and extends from the rear of a vehicle. The assembly (10) consists of a detent hinge (50) having one end that is fastened to an assembly attachment collar (30) that attaches to the ball-mount receiver (120) and a second end that is attached to a receiver cover (12). When the vehicle is not towing a trailer the receiver cover (12) is hingedly pressed against the opening of the ball-mount receiver (120). When a ball-mount (130) is to be used, the receiver cover (12) is rotated downward from its closed position into an open position which remains open due to the detent action of the hinge (50). To enhance the utility and the aesthetics of the assembly (10) an indicia plate (108) can be fastened to the receiver cover (12) which allows the indicia to be viewed when the cover (12) is in the closed position.

16 Claims, 3 Drawing Sheets

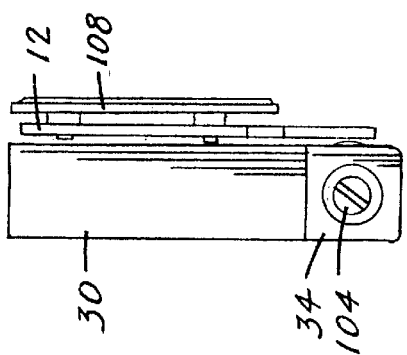
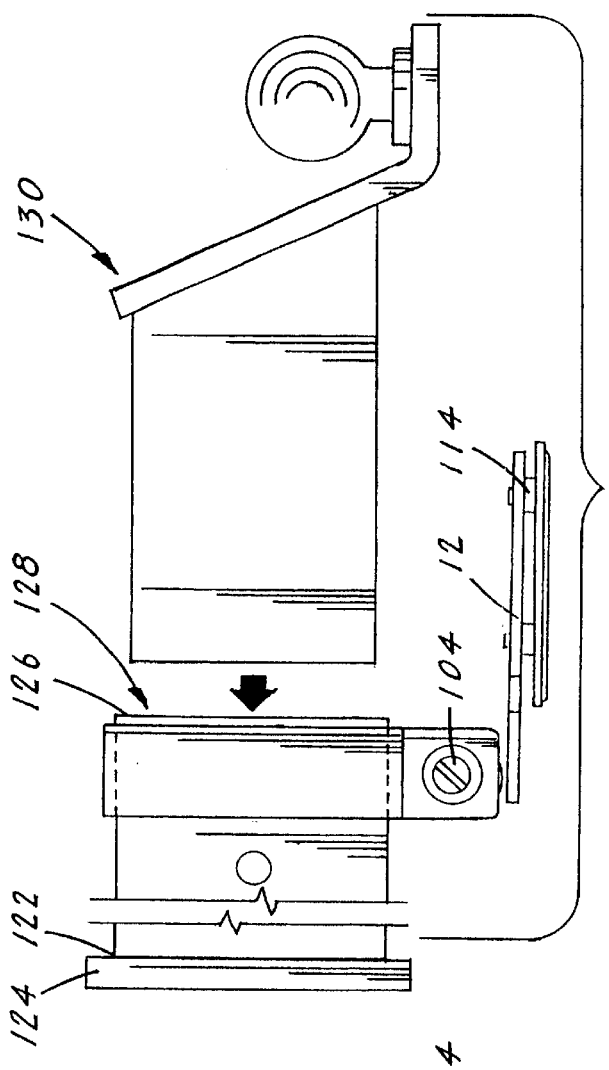
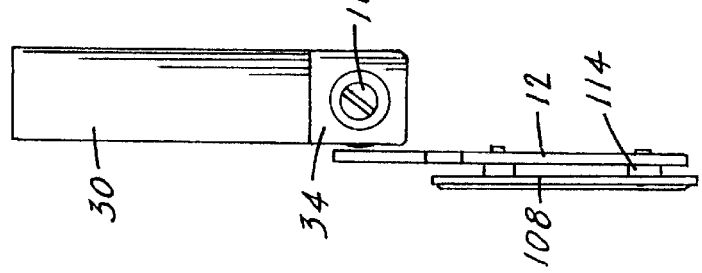
FIG. 10
FIG. 9
FIG. 8

FLIP-DOWN BALL MOUNT COVER ASSEMBLY

TECHNICAL FIELD

The invention pertains to the general field of ball-mount receivers and more particularly to a cover that is hingedly attached to a ball-mount receiver to allow the cover to be placed in either a closed position or in an open position.

BACKGROUND ART

The use of a vehicle to tow a trailer, boat or another vehicle has long been the most practical and easiest method. Formerly, a truck or car would be utilized for towing, due to the substantial strength and torque found in these vehicles. Most people, especially those who had the means, preferred not to use their daily driving vehicle for towing, in that when towing a large structure, such as a boat, a large amount of strain is put on the towing vehicle.

The arrival of the sport utility vehicle (SUV), along with the practice of designing and building trucks with some of the looks and amenities of modern cars, has created a vehicle suitable for towing. The SUVs and new trucks are easily capable of towing even large structures while still providing the driver and passengers with a comfortable ride.

The prevalence of this trend is most obvious in the fact that most new SUVs and trucks come with a ball-mount receiver as standard equipment.

Although this is very convenient, and allows versatility for the vehicle, many owners, even those who tow regularly, do not like the appearance of the ball mount. This is particularly true of those individuals who buy the higher-prized SUVs, which by all accounts can be considered luxury vehicles.

There have been attempts to disguise the ball-mount receiver, which include providing a removable cover that can be Placed over the ball mount. Unfortunately, these covers can be easily misplaced and require some work to attach and detach, and can create a nuisance when a person is attempting to quickly attach a structure to be towed.

If there were a means for covering a ball-mount receiver by using a device that did not require the cover to be physical removed, that was easily and conveniently placed over the ball-mount receiver and that included indicia complimentary to the vehicle or the driver, it would be very beneficial.

A search of the prior art did not disclose any patents that read directly on the claims of the instant invention however, the following U.S. patents were considered related:

| U.S. PAT. NO. | INVENTOR | ISSUED |
| --- | --- | --- |
| 5,992,871 | Rowland, et al | November 30. 1999 |
| 5,503,423 | Roberts, et al | April 2, 1996 |
| 5,011,176 | Eppinette | April 30, 1991 |

The U.S. Pat. No. 5,992,871 patent discloses a swing-away hitch for trailers, and in particular boat trailers. The invention consists of sandwiching a tube (tongue of the trailer) between two plates with holes that align with tubular sleeves welded on opposite sides at the end of a hitch cover to convert it to a swing-away hitch. Pins are inserted to mount the swing-away hitch onto the swing-away hitch assembly.

The U.S. Pat. No. 5,503,423 patent discloses a swing away hitch for a trailer and method of making same. A tubular hitch is sandwiched between top and bottom plates. Holes through the hitch and the plates are aligned with one another and a tubular casing is inserted through the holes. Thereafter, the ends of the tubular casings are "swedged" or expanded by pressing bullet shaped pins into opposite ends of the casings. The swedging effect securely fastens the components. Finally, pins are inserted through the casings to mount the swing away hitch on the trailer.

The U.S. Pat. No. 5,011,176 patent discloses a coupling device for connecting a towed vehicle to a towing vehicle in which the towed vehicle has a towing bar. There is a telescopic arm received within the towing bar with an end of the telescopic arm pivotally connected to an articulating arm. The other end of the articulating arm includes a trailer hitch adapted for connection to a trailer hitch ball. There is an anti-pivot collar which encircles the point where the telescopic arm and the articulating arm are pivotally connected. BY selectively extending the telescopic arm and moving the anti-pivot collar to permit articulation between the pivotal and telescopic arms, the coupling device can simplify connection between a towed and towing vehicle.

DISCLOSURE OF THE INVENTION

The flip-down ball-mount cover assembly is designed to provide a practical and aesthetic hinged cover for covering the opening on a ball-mount receiver projecting from the rear end of a vehicle. The cover remains in a closed position when a ball mount is not in use. Conversely, when a ball mount is needed, the cover is simply rotated from its closed position to an open position. In the open position the opening on the receiver is exposed to allow a ball mount to be normally attached.

In its most basic design configuration, the flip-down ball-mount assembly consists of:

A receiver cover dimensioned to encompass the opening on the ball-mount receiver. The cover has a first edge from where extends a center tab, a second edge, an outer surface, and an inner surface.

An assembly attachment collar dimensioned to fit around the rear perimeter edge of the ball-mount receiver. The collar includes a left-hinge mounting tab and a right-hinge mounting tab, and A detent hinge attached between the left and right-hinge mounting tabs on the collar, and the center tab on the cover.

The receiver cover can also be designed to have attached to its outer surface an indicia plate which is visible from the rear of the vehicle when the cover is in its closed position. The indicia can include various logos designs and/or the manufacturer of the particular vehicle.

The detent hinge is the primary element which allows the detented cover to be placed and held in the closed position and to be rotated and held in an open position. The hinge includes a left and right resilient spacer which provide the required spring-action to allow the male detents to smoothly engage and disengage from their respective female detents.

In view of the above disclosure, it is the primary object of the invention to produce a flip-down ball-mount assembly that easily attaches to a ball-mount receiver. With the assembly attached, the assembly cover can be placed over the opening on a ball-mount receiver or the cover can be placed in an open position. In the open position the receiver opening is exposed allowing a ball mount to be inserted and attached. In addition to the primary object of the invention it is also an object of the invention to produce an assembly that:

can be designed to allow an indicia plate to be attached to the outer surface of the cover. The indicia can be made in several shapes, colors and include a variety of names, logos and the like.

when the cover is closed, debris is prevented from entering the ball-mount receiver has a long useful life, is cost effective from both a manufacturing and consumer points of view.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 8 is a side elevational view of the assembly shown with the receiver cover and the indicia plate rotated 180° from its fully closed position.

FIG. 9 is a side elevational view of the assembly shown with the receiver cover and the indicia plate rotated 90° from its fully closed position. This figure also shows a ball-mount aligned in position to be inserted into the opening of a ball-mount receiver.

FIG. 10 is a side elevational view of the assembly shown with the receiver cover and the indicia plate placed in the fully closed position.

BEST MODE FOR CARRYING OUT THE INVENTION

Figure 1:
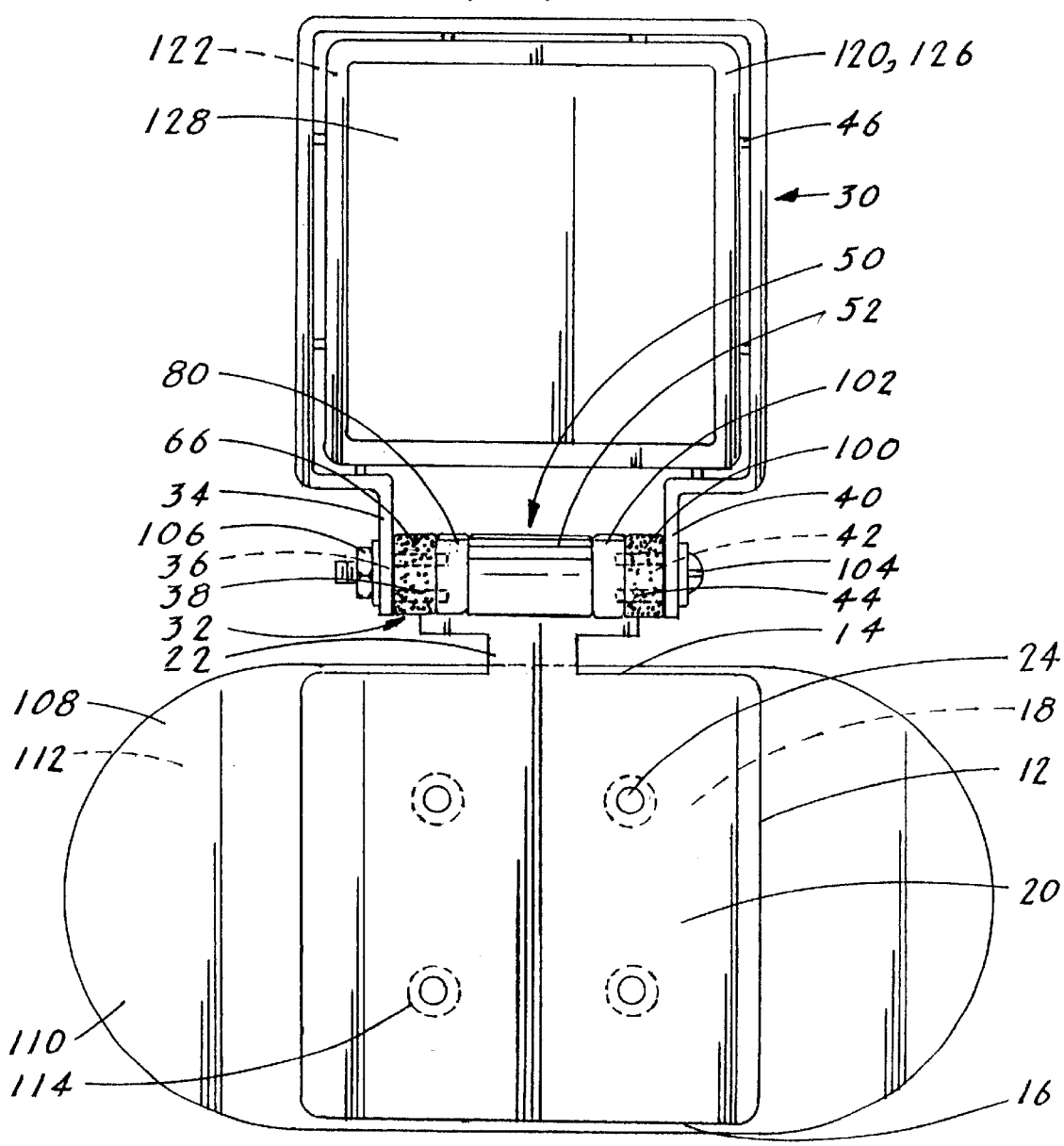
FIG. 1 is a rear elevational view of the flip-down ball-mount cover assembly with the inner side of the receiver cover and the indicia plate shown in an 180° vertical position which exposes the opening on the ball-mount receiver to which is attached the assembly attachment collar.

The best mode for carrying out the invention is presented in terms of a preferred embodiment for a flip-down ball-mount cover assembly 10. The assembly 10 is adapted to function in combination with a ball-mount receiver 120 having a front edge 122 that is attached to a vehicle structure 124 and a rear perimeter edge 126 having an opening 128 which receives a ball-mount 130.

The preferred embodiment of the assembly 10, as shown in FIGS. 1–10, is comprised of the following major elements: a receiver cover 12, an assembly attachment cover 30 and a detent hinge 50.

The receiver cover 12, as shown in FIGS. 1 and 8–10, is dimensioned to encompass the opening 128 on the ball-mount receiver 120, as shown best in FIG. 1. The cover 12 has a front edge 14, a second edge 16, an outer surface 18, an inner surface 20 and a center tab 22 that extends outward from the first edge 14.

The assembly attachment collar, as shown in FIGS. 1 and 9, is dimensioned to fit and be tightened around the rear perimeter edge 126 of the ball-mount receiver. The collar 30 includes an open lower section 32 which terminates with a left-hinge mounting tab 34 and a right-hinge mounting tab 40. The left tab 34 has a left bore 36 and a pair of inward protruding left-hinge alignment pins 38; the right tab 40 likewise has a right bore 42 and a pair of inward protruding right-hinge alignment pins 44. To aid in providing a clamping force when the collar 30 is attached to the ball-mount receiver 120, the collar can be molded to include a plurality of lateral protrusions 46 as shown in FIG. 1.

Figure 2:
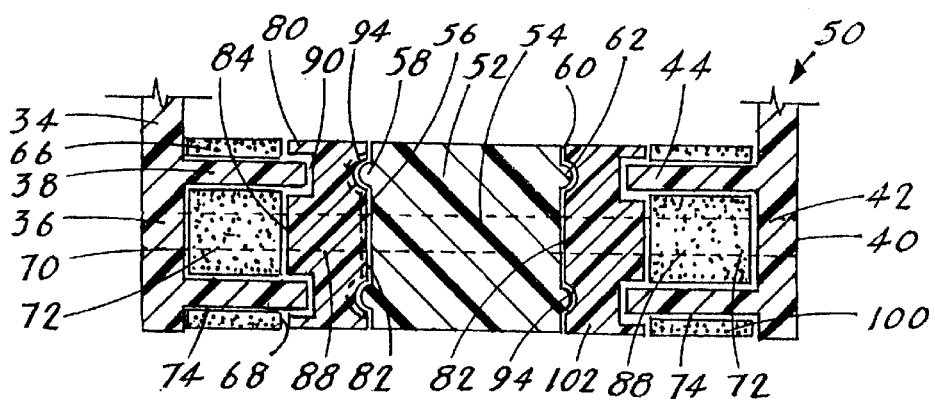
FIG. 2 is a cross-sectional view of the detent hinge as shown in FIG. 1.

The detent hinge 50 is shown attached to the assembly 10 in FIG. 1 and in cross-section in FIG. 2. The hinge is comprised of a stationary section 52, a circular left resilient spacer 66, a circular left rigid spacer 80, a circular right resilient spacer 100 and a circular right rigid spacer 102.

Figure 3:
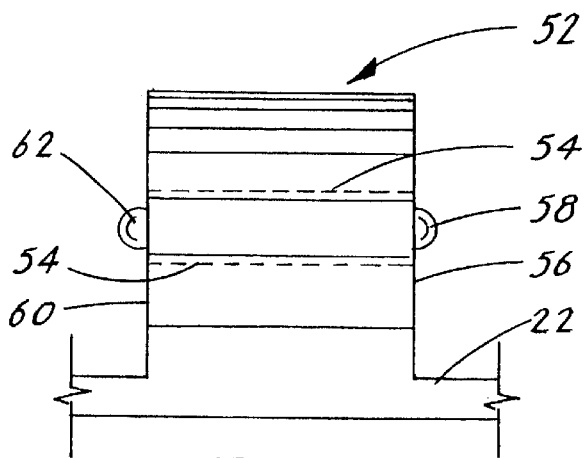
FIG. 3 is an elevational view showing the stationary center section attached to the center tab located on the receiver cover.
Figure 4:
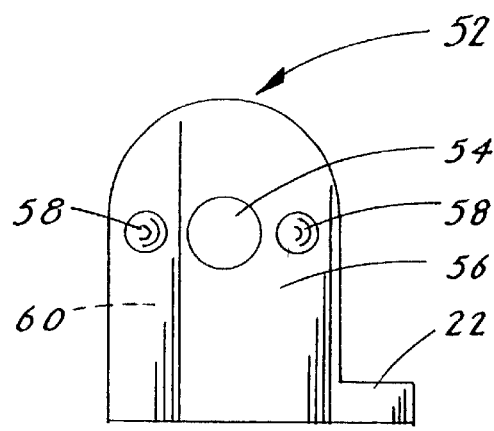
FIG. 4 is a side elevational view of the stationary center section as shown in FIG. 3.

The stationary section 52, as best shown in FIGS. 3 and 4, is integrally attached (molded) to the inner surface of the center tab 22 which projects outward from the receiver cover 12 as shown in FIG. 1. The center section 52 has a bolt bore 54 substantially centered therethrough, a left surface 56 and a right surface 60. From the left surface 56 protrudes a pair of aligned, left male detents 58; from the right surface 60 protrudes a pair of aligned, right male detents 62. As shown best in FIG. 2, adjacent the left side of the stationary center section 52 is the circular left rigid spacer 80 followed by the circular left resilient spacer 66; adjacent the right side is likewise the circular right rigid spacer 102 followed by the circular right resilient spacer 100.

Figure 5:
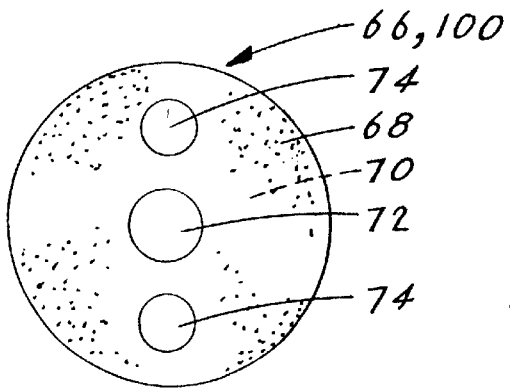
FIG. 5 is a side elevational view of the left and right resilient spacers.

The left resilient spacer 66, as shown in FIGS. 2 and 5, includes a flat inner surface 68, a flat outer surface 70, a centered bolt bore 72 and a pair of pin bores 74 dimensioned and aligned to be inserted into the pair of left-hinge alignment pins 38 located on the left-hinge mounting tab 34. The right resilient spacer 100 similarly has a flat inner surface 68, a flat outer surface 70, a centered bolt bore 72 and a pair of pin bores 74. The two pin bores 74 are dimensioned and aligned to be inserted respectively into the pair of right-hinge alignment pins 44 located on the right-hinge mounting tab 40. When the two pin pairs are inserted the ends of each of the two pins protrude outward from the flat inner surface 68 of the left resilient spacer 66 and the flat inner surface 68 of the right resilient spacer 100. The resilient spacers 66, 100, which are made of a rubber compound such as polyurethane, provide the spring action required by the detent hinge 50. The spring action allows the left and right male detents 58,62 on the stationary center section 52 to smoothly engage and disengage from the respective female detents 94 on the left and right rigid spacers 80, 102.

Figure 6:
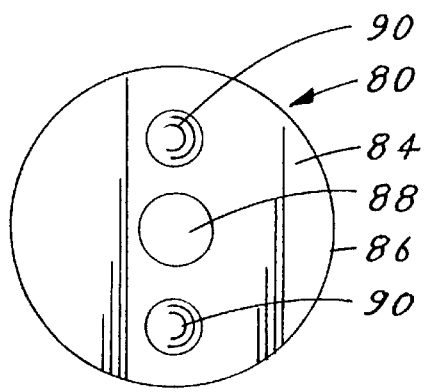
FIG. 6 is a side elevational view of the outward side of the left and right rigid spacers.
Figure 7:
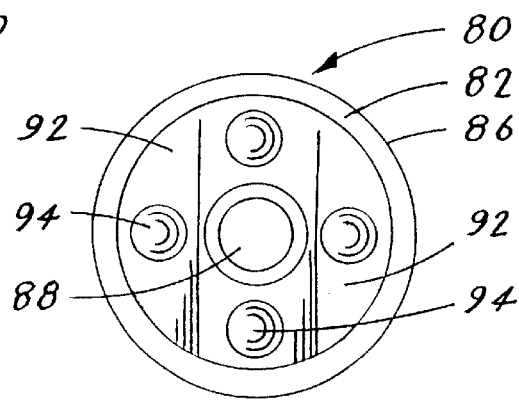
FIG. 7 is a side elevational view of the inward side of the left and right rigid spacers.

As shown in FIG. 2, between the left and right surfaces 56,60 of the stationary center section se and the flat inner surface 68 of the circular left resilient spacer 66 and circular right resilient spacer 100 are located respectively the circular left rigid spacer 80 and the circular right rigid spacer 102. Each of the circular rigid spacers 80,102 have an inner side 82, an outer side 84, an outer perimeter 86 and a centered bolt bore 88. The outer sides 84 have a pair of pin cavities 90, as shown in FIGS. 2 and 6, which are dimensioned and aligned to receive the respective ends of the left and right hinge alignment pins 38,44 that protrude from the inner surface 68 of the left and right resilient spacers 66,100 as shown in FIG. 2. The inner sides 82 of the left and right rigid spacers 80, 102 have a 360° channel 92 located between the bolt bore 88 and the outer perimeter 86 as shown in FIG. 7. Within the channel 92 are a set of four equally spaced female detents 94 which are dimensioned and aligned to engage the pair of left and right male detents 58,62 protruding from the left and right surfaces 56,60 of the stationary center section 52 as shown in FIG. 2. The channel allows the left and right male detents 58,62 to be guided and held within their circular traversing path.

To secure the detent hinge 50 to the assembly attachment collar 30, a bolt 104 is inserted into the left or right bolt bore 36,42 on the collar 30 and sequentially into the bolt bores on the left resilient pacer 66, the left rigid spacer 80, the right rigid spacer 102, the right resilient spacer 100 and into the right bolt bore 42 on the collar 30. The bolt is then secured by a nut 106 as shown in FIG. 2.

To increase the utility and aesthetics of the flip-down ball-mount cover assembly 10, an indicia plate 108 is added to the assembly 10. The indicia plate 108, as shown in FIGS. 1 and 8–10, is dimensioned to overlap the rear perimeter edge 126 of the ball-mount receiver 120. The plate 108 has an inner side 110 and an outer side 112, with the inner side 110 having a plurality of threaded standoffs 114. The standoffs 114 are in alignment with a plurality of plate attachment bolt bores 24 on the receiver cover 12. When a bolt is threaded into the respective bores 24 and standoffs 114 the indicia plate 108 is secured.

When the flip-down ball-mount cover assembly 10 is attached to the ball-mount receiver 120 the receiver cover 12 with the indicia plate 108 attached can be rotated sequentially from a fully closed 0° vertical position, as shown in FIG. 10 to an open 90° horizontal position as shown in FIG. 9 or to an open 180° vertical Position as shown in FIG. 8. The detents on the detent hinge 50 maintain the cover in the closed or the two open positions. In either of the open positions a ball mount 130 can be normally inserted into the opening 128 of the ball-mount receiver 120.

While the invention has been described in complete detail and pictorially shown in the accompanying drawings it is not to be limited to such details since many changes and modifications may be made to the invention without departing from the spirit and the scope thereof. For example, the assembly 10, with the exception of the resilient spacers, is preferably made of a high impact plastic. However, a metal can also be used. Hence, it is described to cover any and all modifications and forms which may come within the language and scope of the claims.

What is claimed is:

1. A flip-down ball-mount cover assembly adapted to function in combination with a ball-mount receiver having a front edge that is rigidly attached to a vehicle structure and a rear perimeter edge having an opening into which is inserted a ball mount, said assembly comprising:
    a) a receiver cover dimensioned to encompass the opening on the ball mount receiver, said cover having a first edge from where extends a center tab, a second edge, an outer surface, and an inner surface,
    b) an assembly attachment collar dimensioned to fit around the rear perimeter edge of the ball-mount receiver, said collar having a left-hinge mounting tab and a right-hinge mounting tab, and,
    c) a detent hinge attached between the left and right-hinge mounting tabs on said collar and the center tab on said cover wherein said hinge allows said receiver cover to be rotated from a closed position to an open position, wherein in the open position a ball-mount can be normally inserted into the opening on the ball-mount receiver.

2. The assembly as specified in claim 1 wherein the left-hinge mounting tab having a bolt bore and a pair of inward protruding left hinge alignment pins and right-hinge mounting tab having a bolt bore and a pair of inward protruding right-hinge alignment pins.

3. The assembly as specified in claim 1 wherein said detent hinge further comprises:
    a) a stationary center section integrally attached to the inner surface of the center tab on said receiver cover, said center section having a bolt bore substantially centered therethrough, a left surface wherefrom protrudes a pair of aligned, left male detents, a right surface wherefrom protrudes a pair of aligned, right male detents,
    b) a circular left resilient spacer having a flat inner surface, a flat outer surface, a centered bolt bore and a pair of pin bores dimensioned and aligned to be inserted into the pair of left-alignment pins on the left-mounting tab, wherein when inserted the ends of the left-hinge alignment pins protrude outward from the flat inner surface of said left resilient spacer,
    c) a circular, left rigid spacer having an inner side, an outer side, an outer perimeter and a centered bolt borer with the outer side having a pair of pin cavities which are dimensioned and aligned to receive the ends of the left-hinge alignment pins protruding from the inner surface of Said left resilient spacer, and with the inner side of said left rigid spacer having a set of four equally spaced female detents dimensioned and aligned to engage the pair of male detents protruding from the left surface of said stationary center section,
    d) a circular, right resilient spacer having a flat inner surface, a flat outer surface, a centered bolt bore and a pair of pin bores dimensioned and aligned to be inserted into the pair of right-hinge alignment pins on the right mounting tab, wherein when inserted the ends of the right-hinge alignment pins protrude outward from the flat inner surface of said right resilient spacer, and
    e) a circular, right rigid spacer having an inner side, a flat outer side, an outer perimeter and a centered bolt bore, with the outer side having a pair of pin cavities which are dimensioned and aligned to receive the ends of the right-hinge alignment pins protruding from the inner surface of said right resilient spacer, and with the inner side of said right rigid spacer having a set of four equally spaced female detents dimensioned and aligned to engage the pair of male detents protruding from the right surface of said stationary center section, wherein said detent hinge is secured to said assembly attachment collar by a bolt inserted through the respective bolt bores.

4. The assembly as specified in claim 1 further comprising an indicia plate attached, by an attachment means to the outer surface of said receiver cover.

5. The assembly as specified in claim 1 wherein the left and right resilient spacers are made of a rubber compound.

6. The assembly as specified in claim 1 wherein when said assembly attachment collar further comprises on its inner surface a plurality of lateral protrusions which aid in providing a clamping force when the collar is attached to the ball mount receiver.

7. The assembly as specified in claim 1 wherein the inner side of said left and right rigid spacers further comprise a circular channel which is designed to allow the respective male detents protruding from said stationary center section to be guided and held within their circular traversing path.

8. The assembly as specified in claim 1 wherein said left and right resilient spacers provide the required spring action to allow the left and right male detents to smoothly engage and disengage from their respective female detents on the left and right rigid spacers.

9. A flip-down ball-mount cover assembly adapted to function in combination with a ball-mount receiver having a front edge that is rigidly attached to a vehicle structure and a rear perimeter edge having an opening into which is inserted a ball mount, said assembly comprising:

a) a receiver cover dimensioned to encompass the opening on the ball mount receiver, said cover having a first edge, a second edge an outer surface, an inner surface and a center tab extending outward from the first edge, b) an assembly attachment collar dimensioned to fit around the rear perimeter edge of the ball-mount receiver, wherein said collar includes an open lower section which terminates with a left-hinge mounting tab having a left bolt bore and a pair of inward protruding left-hinge alignment pins, and a right-hinge mounting tab having a right bolt bore and a pair of inward protruding right-hinge alignment pins, c) a detent hinge comprising:

(1) a stationary center section integrally attached to the inner surface of the center tab on said receiver cover, said center section having a bolt bore substantially centered therethrough, a left surface wherefrom protrudes a pair of aligned, left male detents, a right surface wherefrom protrudes a pair of aligned, right male detente, (2) a circular left resilient spacer having a flat inner surface, a flat outer surface, a centered bolt bore and a pair of pin bores dimensioned and aligned to be inserted into the pair of left-hinge alignment pins on the left-hinge mounting tab, wherein when inserted the ends of the left-hinge alignment pins protrude outward from the flat inner surface of said left resilient spacer, (3) a circular, left rigid spacer having an inner side, an outer side, an outer perimeter and a centered bolt bore, with the outer side having a pair of pin cavities which are dimensioned and aligned to receive the ends of the left alignment pins protruding from the inner surface Of said left resilient spacer, and with the inner side of said left rigid spacer having a 360° channel located between the spacer's outer perimeter and the bolt bore, with the channel having a set of four equally spaced female detents dimensioned and aligned to engage the pair of male detents protruding from the left surface of said stationary center section, (4) a circular, right resilient spacer having a flat inner surface, a flat outer surface, a centered bolt bore and a pair of pin bores dimensioned and aligned to be inserted into the pair of right-hinge alignment pins on the right-hinge mounting tab, wherein when inserted the ends of the right-hinge alignment Pins protrude outward from the flat inner surface of said right resilient spacer, and (5) a circular, right rigid spacer having an inner side, an outer side, an outer perimeter and a centered bolt bore, with the outer side having a pair of pin cavities which are dimensioned and aligned to receive the ends of the right-hinge alignment pins protruding from the inner surface of said right resilient spacer and with the inner side of said right rigid spacer having a 360° channel located between the spacer's outer perimeter and the bolt bore, with the channel having a set of four equally spaced female detents dimensioned and aligned to engage the pair of right male detents protruding from the right surface of said stationary center section, wherein to secure said detent hinge to said assembly attachment collar, a bolt is inserted into the left centered bolt bore on said collar and sequentially into the bolt bores on said left resilient spacer, said left rigid spacer, said right rigid spacer, said right resilient spacer and into the right bolt bore on said collar where a nut secures the bolt, wherein when said assembly attachment collar is attached to the ball-mount receiver, the receiver cover can be rotated from a fully opened horizontal or vertical position to a fully closed vertical position, wherein when in the Open position a ball mount can be normally inserted into the opening on the ball-mount receiver.

10. The assembly as specified in claim 9 wherein said receiver cover further having a plurality of plate attachment bolt bores therethrough.

11. The assembly as specified in claim 9 wherein the left and right resilient spacers are made of polyurethane.

12. The assembly as specified in claim 10 further comprising an indicia plate dimensioned to overlap the rear perimeter edge of the ball-mount receiver, said plate having an inner side and an outer side, with the inner side having a plurality of threaded standoffs in alignment with the plurality of plate attachment bolt bores on said receiver cover, wherein when a bolt is threaded into the respective plate attachment bolt bores and into the threaded standoffs, said inner indicia plate is attached.

13. The assembly as specified in claim 12 wherein when said assembly attachment collar is attached to the ball mount receiver, said receiver cover with said indicia plate attached can be rotated sequentially from a fully closed 0° vertical position to an open 90° horizontal position and to an open 180° vertical position.

14. The assembly as specified in claim 9 wherein when said assembly attachment collar further comprises on its inner surface a plurality of lateral protrusions which aid in providing a clamping force when the collar is attached to the ball-mount receiver.

15. The assembly as specified in claim 9 wherein the 360° channel located on the inner side of said circular left and right rigid spacers allows the left and right male detents to be guided and held within their circular traversing path.

16. The assembly as specified in claim 15 wherein said left and right; resilient spacers provide the required spring action to allow the left and right male detents to smoothly engage and disengage from their respective female detents on the left and right rigid spacers.

* * * * *